US006537684B1

(12) United States Patent
Doerner et al.

(10) Patent No.: US 6,537,684 B1
(45) Date of Patent: *Mar. 25, 2003

(54) ANTIFERROMAGNETICALLY COUPLED MAGNETIC RECORDING MEDIA WITH BORON-FREE FIRST FERROMAGNETIC FILM AS NUCLEATION LAYER

(75) Inventors: Mary Frances Doerner, Santa Cruz, CA (US); Eric Edward Fullerton, Morgan Hill, CA (US); David Thomas Margulies, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 09/631,908

(22) Filed: Aug. 4, 2000

(51) Int. Cl.$^7$ .............................. G11B 5/66; G11B 5/70; H01F 1/01; B32B 15/00; B32B 7/02
(52) U.S. Cl. ....................... 428/611; 428/667; 428/212; 428/213; 428/336; 428/694 TS; 428/694 TM; 428/900
(58) Field of Search ................................. 428/611, 667, 428/694 TM, 212, 213, 336, 694 TS, 900

(56) References Cited

U.S. PATENT DOCUMENTS

| | | | |
|---|---|---|---|
| 5,180,640 A | * 1/1993 | Yamashita et al. | 428/611 |
| 5,523,173 A | * 6/1996 | Doerner et al. | 428/611 |
| 6,077,586 A | 6/2000 | Bian et al. | 428/65.3 |
| 6,280,813 B1 | * 8/2001 | Carey et al. | 428/65.3 |
| 6,403,241 B1 | * 6/2002 | Chen et al. | 428/694 TS |

OTHER PUBLICATIONS

Abarra et al.. "Longitudinal MAgnetic Recording Media With Thermal Stabilization", Apr. 2000, Intermag 2000: Program of the 2000 IEEE International Magnetics Conference, p. AA–06.*
Parkin et al., "Oscillations in Exchange Coupling and Magnetoresistance in Metallic Superlattice Structures: Co/Ru, Co/Cr, and Fe/Cr", May 1990, Phys. Rev. Lett., vol. 64, No. 19, pp. 2304–2307.*

* cited by examiner

Primary Examiner—Holly C. Rickman
(74) Attorney, Agent, or Firm—Thomas R. Berthold

(57) ABSTRACT

A magnetic recording medium for data storage uses a magnetic recording layer having at least two ferromagnetic films exchange coupled together antiferromagnetically across a nonferromagnetic spacer film. In this antiferromagnetically-coupled (AFC) recording layer the magnetic moments of the two ferromagnetic films are oriented antiparallel, and thus the net remanent magnetization-thickness product (Mrt) of the AFC recording layer is the difference in the Mrt values of the two ferromagnetic films. This reduction in Mrt is accomplished without a reduction in thermal stability of the recording medium. The lower ferromagnetic film in the AFC recording layer is a boron-free ferromagnetic CoCr alloy that does not require a nucleation layer between it and the Cr alloy underlayer. The ferromagnetic CoCr alloy has sufficient saturation magnetization ($M_s$) to produce excellent magnetic recording performance for the AFC recording layer, while also serving as a template or nucleation layer to induce the growth of the spacer layer and top ferromagnetic boron-containing ferromagnetic film.

20 Claims, 2 Drawing Sheets

US 6,537,684 B1

ANTIFERROMAGNETICALLY COUPLED MAGNETIC RECORDING MEDIA WITH BORON-FREE FIRST FERROMAGNETIC FILM AS NUCLEATION LAYER

RELATED APPLICATION

This application is related to pending application Ser. No. 09/416,364 filed Oct. 8, 1999 and titled "MAGNETIC RECORDING MEDIA WITH ANTIFERROMAGNETICALLY COUPLED FERROMAGNETIC FILMS AS THE RECORDING LAYER", now U.S. Pat. No. 6,280,813, which is incorporated herein by reference.

TECHNICAL FIELD

This invention relates generally to magnetic recording media, and more particularly to a magnetic recording disk with an antiferromagnetically-coupled (AFC) magnetic recording layer of the type described in the above-cited co-pending application.

BACKGROUND OF THE INVENTION

Conventional magnetic recording media, such as the magnetic recording disks in hard disk drives, typically use a granular ferromagnetic layer, such as a sputter-deposited cobalt-platinum (CoPt) alloy, as the recording medium. Each magnetized domain in the magnetic layer is comprised of many small magnetic grains. The transitions between magnetized domains represent the "bits" of the recorded data. IBM's U.S. Pat. Nos. 4,789,598 and 5,523,173 describe this type of conventional rigid disk.

As the storage density of magnetic recording disks has increased, the product of the remanent magnetization Mr (where Mr is measured in units of magnetic moment per unit volume of ferromagnetic material) and the magnetic layer thickness t has decreased. Similarly, the coercive field or coercivity ($H_c$) of the magnetic layer has increased. This has led to a decrease in the ratio Mrt/$H_c$. To achieve the reduction in Mrt, the thickness t of the magnetic layer can be reduced, but only to a limit because the stored magnetic information in the layer will be more likely to decay. This decay of the magnetization has been attributed to thermal activation of small magnetic grains (the superparamagnetic effect). The thermal stability of a magnetic grain is to a large extent determined by $K_uV$, where $K_u$ is the magnetic anisotropy constant of the layer and V is the volume of the magnetic grain. As the layer thickness is decreased, V decreases. If the layer thickness is too thin, the stored magnetic information will no longer be stable at normal disk drive operating conditions.

One approach to the solution of this problem is to move to a higher anisotropy material (higher $K_u$). However, the increase in $K_u$ is limited by the point where the coercivity $H_c$, which is approximately equal to $K_u/M_s$ ($M_s$=saturation magnetization), becomes too great to be written by a conventional recording head. A similar approach is to reduce the $M_s$ of the magnetic layer for a fixed layer thickness, which will reduce Mr since Mr is related to $M_s$, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

IBM's previously cited co-application describes a magnetic recording medium wherein the magnetic recording layer is at least two ferromagnetic films antiferromagnetically coupled together across a nonferromagnetic spacer film. In this type of magnetic media, referred to as AFC media, the magnetic moments of the two antiferromagnetically-coupled films are oriented antiparallel, with the result that the net remanent magnetization-thickness product (Mrt) of the recording layer is the difference in the Mrt values of the two ferromagnetic films. This reduction in Mrt is accomplished without a reduction in volume V. Therefore the thermal stability of the recording medium is not reduced. In one embodiment of the AFC medium the ferromagnetic films are sputter deposited CoPtCrB alloy films separated by a Ru spacer film that has a thickness to maximize the antiferromagnetic coupling between the two CoPtCrB films. One of the ferromagnetic films is made thicker than the other, but the thicknesses are chosen so that the net moment in zero applied magnetic field is low, but nonzero.

AFC media is to be distinguished from conventional "laminated" media, wherein two or more magnetic layers are spaced apart by an nonmagnetic spacer layer so that the magnetic layers are deliberately magnetically decoupled. It is known that substantially improved SNR can be achieved by the use of laminated media. The reduction in intrinsic media noise by lamination is believed due to a decoupling of the magnetic interaction or exchange coupling between the magnetic layers in the laminate. This discovery was made by S. E. Lambert, et al., "Reduction of Media Noise in Thin Film Metal Media by Lamination", *IEEE Transactions on Magnetics*, Vol. 26, No. 5, September 1990, pp. 2706–2709, and subsequently patented in IBM's U.S. Pat. No. 5,051,288. IBM's more recent U.S. Pat. No. 6,077,586 describes a laminated disk with special seed layers and magnetically decoupled boron-containing ferromagnetic layers.

In general, adding more layers to a disk structure adds complexity to the manufacturing process. Because AFC media require a larger number of sputtering stations due to the larger number of layers that must be sputtered, it may be necessary to substantially modify the existing disk manufacturing line. In addition, the use of a boron-containing alloy like CoPtCrB in the AFC films, which is necessary for high performance media, requires the use of a special onset or nucleation layer to enhance the growth of the CoPtCrB films so that the C-axis of these films is in the plane of the films. The nucleation layer, which is typically a nonferromagnetic CoCr alloy, requires still another sputtering station in the manufacturing line.

What is needed is AFC media that possesses high performance magnetic properties but does not require the addition of sputtering stations to the existing manufacturing line.

SUMMARY OF THE INVENTION

The invention is an AFC disk wherein the lower ferromagnetic film in the AFC recording layer is a boron-free ferromagnetic CoCr alloy that does not require a nucleation layer between it and the Cr or Cr alloy underlayer. The ferromagnetic CoCr alloy has sufficient saturation magnetization ($M_s$) and grain structure to produce excellent magnetic recording performance for the AFC recording layer, while also serving as a nucleation layer to induce the in-plane C-axis growth of the top boron-containing ferromagnetic film through the spacer layer.

For a fuller understanding of the nature and advantages of the present invention, reference should be made to the following detailed description taken together with the accompanying figures.

DETAILED DESCRIPTION OF THE INVENTION

General Structure of an AFC Disk

Figure 1:
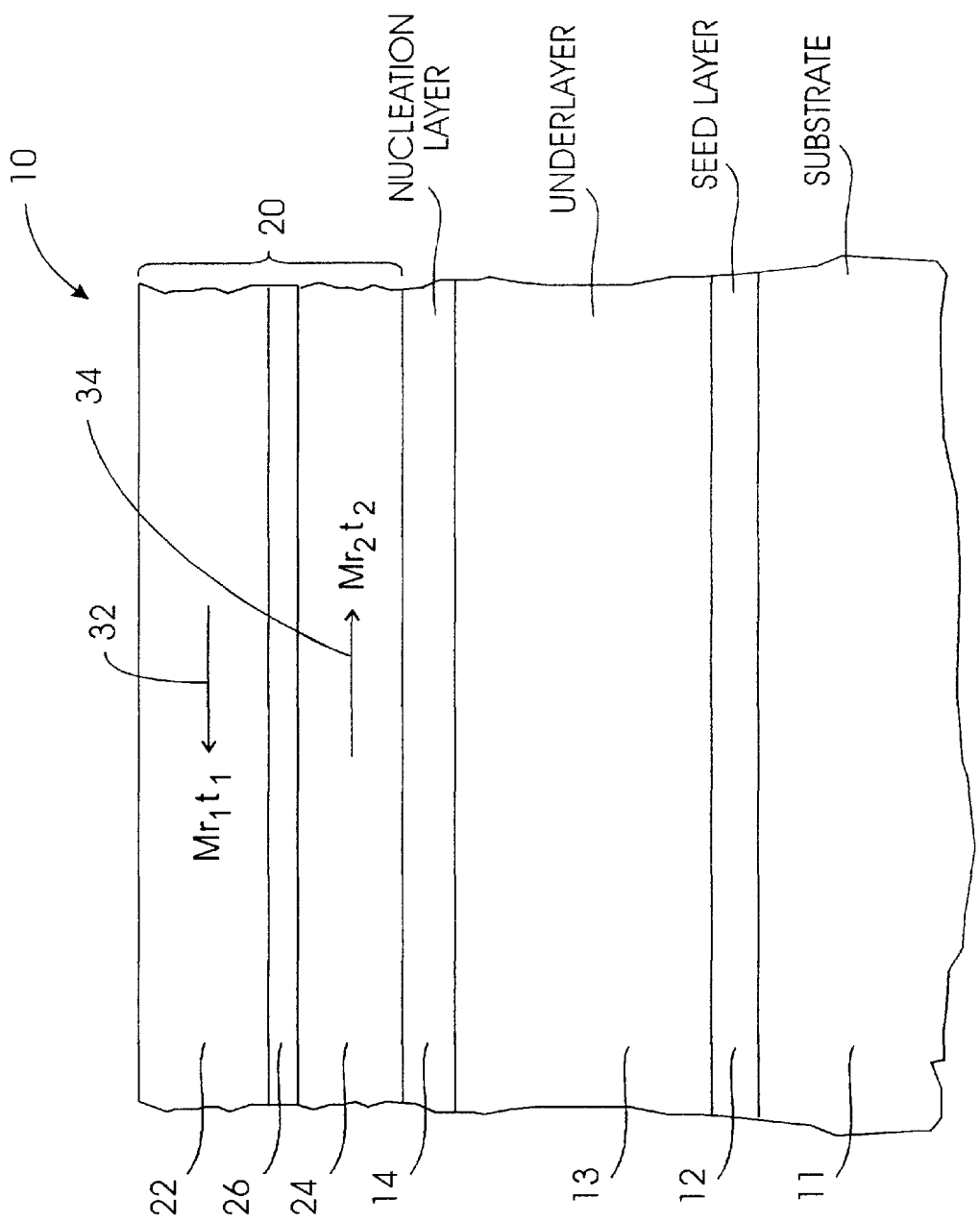
FIG. 1 is a schematic sectional view of an AFC magnetic recording disk as described in the previously cited co-pending application.

The magnetic recording disk of the present invention is of the type that has a magnetic recording layer made of two or more ferromagnetic films that are coupled antiferromagnetically (AF) to their neighboring ferromagnetic films by one or more nonferromagnetic spacer films. FIG. 1 illustrates the cross sectional structure of a disk 10 with an antiferromagnetically-coupled (AFC) magnetic layer 20.

The disk substrate 11 is any suitable material, such as glass, SiC/Si, ceramic, quartz, or an AlMg alloy base with a NiP surface coating. The seed layer 12 is an optional layer that may be used to improve the growth of the underlayer 13. The seed layer 12 is most commonly used when the substrate 11 is nonmetallic, such as glass. The seed layer 12 has a thickness in the range of approximately 1 to 50 nm and is one of the materials, such as Ta, CrTi, NiAl or RuAl, which are useful as seed materials for promoting the growth of subsequently deposited layers in certain preferred crystalline orientations. A pre-seed layer (not shown) may also be used between the glass substrate 11 and the seed layer 12. The underlayer 13 is deposited onto the seed layer, if present, or otherwise directly onto the substrate 11, and is a nonmagnetic material such as chromium or a chromium alloy, such as CrV or CrTi. The underlayer 13 has a thickness in the range of 5 to 100 nm with a typical value being approximately 10 nm.

The AFC magnetic layer 20 is made up of two ferromagnetic films 22, 24 separated by a nonferromagnetic spacer film 26. The nonferromagnetic spacer film 26 thickness and composition are chosen so that the magnetic moments 32, 34 of adjacent films 22, 24, respectively, are AF-coupled through the nonferromagnetic spacer film 26 and are antiparallel in zero applied field. The two AF-coupled films 22, 24 of layer 20 have magnetic moments that are oriented antiparallel, with the upper film 22 having a larger moment. The ferromagnetic films 22, 24 are made of a CoPtCrB alloy with 4 to 20 atomic percent (at. %) platinum, 10 to 23 at. % chromium and 2 to 20 at. % boron. The nonferromagnetic spacer film 26 is ruthenium (Ru).

Because the first ferromagnetic film 24 of the AFC magnetic layer 20 is a boron-containing CoPtCrB alloy, a very thin (typically 1 to 5 nm) Co alloy onset or nucleation layer 14 is deposited on the underlayer 13. The nucleation layer 14 has a composition selected to enhance the growth of the hexagonal close-packed (HCP) CoPtCrB alloy of film 24 so that its C-axis is oriented in the plane of the film. The proper crystalline structure of the first CoPtCrB film 24 in turn enhances the growth of the second CoPtCrB film 22, through the Ru spacer film 26, to also have its C-axis in-plane. If the CoPtCrB film 24 were grown directly on the Cr alloy underlayer 13 without a nucleation layer, then it would not grow with its C-axis in the plane of the film, which would result in poor recording performance. It is well known that the presence of boron is important for achieving small grains in the recording layer, which is necessary for high performance media. Therefore, the nucleation layer 14 allows use of boron-containing alloys as the recording layer and is an essential layer in the disk structure. The nucleation layer 14 typically is a nonferromagnetic Co alloy, and in the preferred embodiment is a CoCr alloy with Cr>=31 atomic percent (at %). This CoCr composition produces a phase which is nonferromagnetic or slightly ferromagnetic.

The AF coupling of ferromagnetic films via a nonferromagnetic transition metal spacer film, like the structure of layer 20 in FIG. 1, has been extensively studied and described in the literature. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic films made of Co, Fe, Ni, and their alloys, such as Ni—Fe, Ni—Co, and Fe—Co, and nonferromagnetic spacer films such as Ru, chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer film is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality.

For this AFC structure of layer 20 the orientations of the magnetic moments 32, 34 of adjacent films 22, 24, respectively, are aligned antiparallel and thus add destructively. The arrows 32, 34 represent the moment orientations of individual magnetic domains that are directly above and below one another across the AF coupling film 26.

While FIG. 1 is shown for an AFC magnetic layer 20 with a two-film structure and a single spacer film, the AFC disk may have additional ferromagnetic films with AF-coupling spacer films between the ferromagnetic films.

Structure of an AFC Disk with a Boron-Free Lower Ferromagnetic Film as a Nucleation Layer High performance commercially available disks using glass substrates and CoPtCrB single-layer magnetic layers can require of six layers. These layers are a pre-seed layer on the glass substrate (not shown in FIG. 1), the seed layer, the underlayer, the nonferromagnetic (or slightly ferromagnetic) CoCr nucleation layer, the CoPtCrB magnetic layer, and the protective overcoat. Common manufacturing sputtering tools, such as the Circulus M12, currently have only seven stations available for actual sputter deposition, assuming the use of two heating stations and one cooling station. Since the AFC magnetic layer replaces the single magnetic layer with three layers, the total number of sputtering cathodes needed to create an AFC disk is eight. This number is larger than is currently available on the Circulus M12 configured as described above. Other types of manufacturing sputter tools may also have a limited number of sputtering cathodes, which makes implementation of AFC media difficult.

The present invention shows that certain materials can serve the dual purpose of acting as the lower ferromagnetic film in the AFC layer as well as facilitating the in-plane C-axis growth of the second CoPtCrB film through the Ru spacer layer. This allows a combination of the nucleation layer and the lower ferromagnetic film of the AFC layer into one layer and therefore only one sputtering cathode is required. This reduces the total number of sputtered layers in the AFC disk structure, thereby overcoming potential manufacturability problems.

To have a layer that acts as both an onset or nucleation layer and the lower layer in the AFC structure, a material is needed which is a Co-alloy, is able to grow epitaxially on an oriented Cr alloy with its C-axis in the plane of the film, and can perform well as the lower ferromagnetic film in the AFC magnetic recording layer. In the present invention it has been demonstrated that such a material is ferromagnetic $Co_{78}Cr_{22}$, which has a saturation magnetization ($M_s$) of 425 emu/cc. X-ray diffraction results showed that for an AFC structure grown on a conventional underlayer, using a $Co_{78}Cr_{22}$ ferromagnetic film directly on the underlayer, a Ru spacer layer directly on the $Co_{78}Cr_{22}$ film, and a CoPtCrB film directly on the Ru spacer layer, the C-axis of the CoPtCrB was in the plane of the film. When a single CoPtCrB film with an Mrt of 0.32 memu/cm² was grown directly on a $Co_{78}Cr_{22}$ film with an Mrt of 0.1 memu/cm² the measured Mrt was 0.43 memu/cm², which is very close to the sum of the Mrt of the two layers. When the same type of CoPtCrB film was grown on a Ru layer of the thickness needed to obtain AF coupling, which in turn was grown directly on the same type of $Co_{78}Cr_{22}$ film, the resulting structure had a Mrt of 0.22 memu/cm². This value is the difference of the Mrt values of the two films and shows that AF coupling is present.

It has also been found that the $CoCr_x$ alloys with $14<x<22$ produce excellent magnetic properties when used as the bottom ferromagnetic film in an AFC recording layer. This was not expected since it is known that a minimum concentration of Cr (usually at least 18 at. %) is needed for grain boundary segregation, which in turn is needed to enable independent switching of the magnetization of the grains. Because these CoCr alloys have a high moment, thinner bottom ferromagnetic films can be used to achieve the desired Mrt. It has been discovered that the thickness of the first ferromagnetic film has a significant effect on the SNR of the resulting AFC structure. Measured SNR for AFC media, all of which had a top ferromagnetic film of $CoPt_{12}Cr_{18}B_8$, but in which the lower CoCr ferromagnetic films were of various thicknesses and Cr compositions (Cr between 14 and 20 at. %) have shown that the lower film of CoCr should have a thickness between 1.5 and 3.5 nm to optimize SNR of the AFC media.

In addition, the ratio of the isolated signal pulse to noise ($S_oNR$) at 15000 flux reversals/millimeter of recorded transitions in a single layer film, using a conventional nonferromagnetic $Co_{69}Cr_{31}$ nucleation layer, was 29.8 dB, while the $S_oNR$ of an AFC disk using $Co_{78}Cr_{22}$ as the first ferromagnetic film and the same type of CoPtCrB material as the second ferromagnetic film, was 31.3 dB. The isolated pulse width (PW50) for these two disks was 122 nm and 116 nm, respectively. This data shows that the AFC disk with $Co_{78}Cr_{22}$ as the first ferromagnetic film grown directly on the Cr alloy underlayer has high magnetic recording performance.

Figure 2:
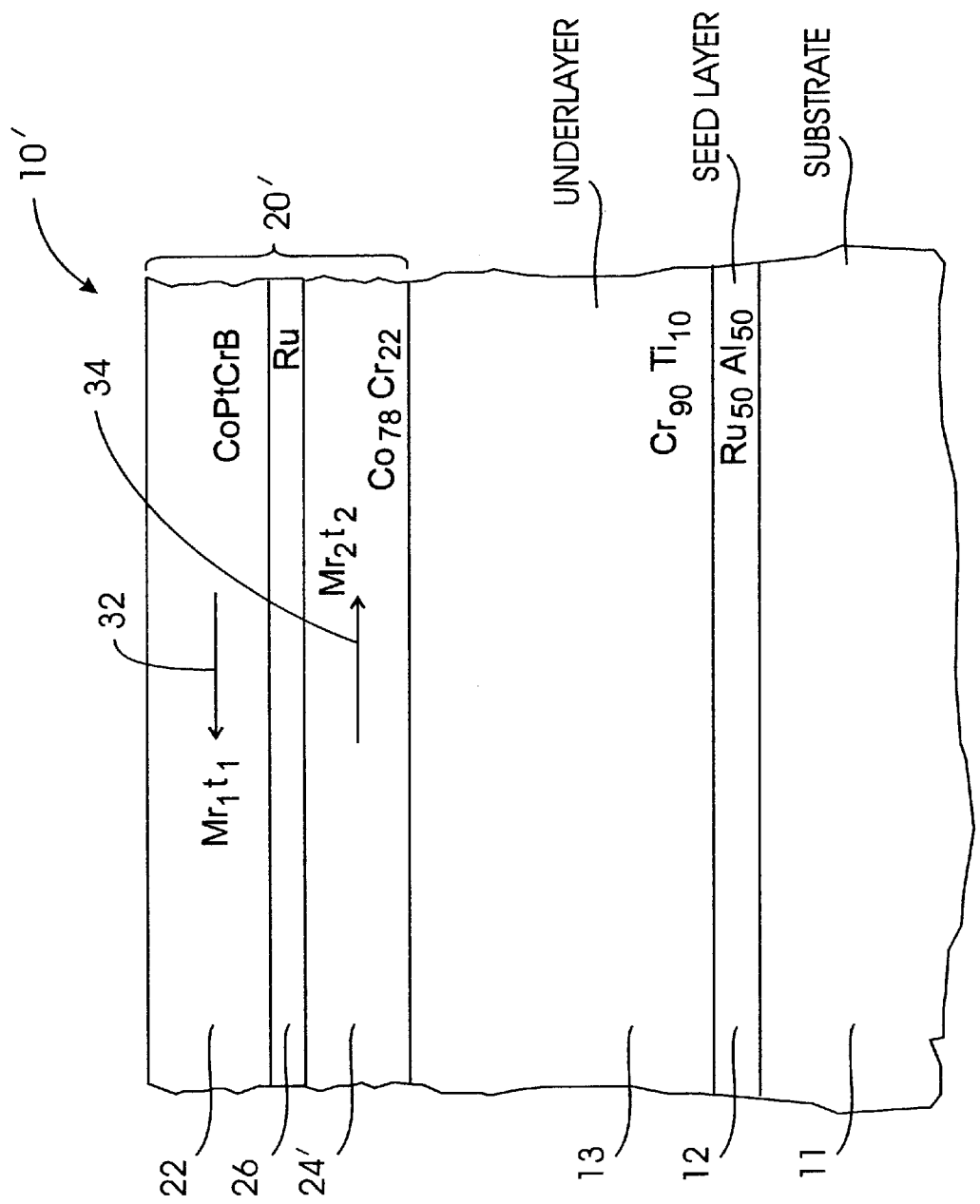
FIG. 2 is a schematic sectional view of an AFC magnetic recording disk according to the present invention.

FIG. 2 shows the preferred structure of the AFC disk 10' according to the invention. The thicknesses and compositions for the various layers in this preferred embodiment are as follows:

Pre-seed layer: $Al_{50}Ti_{50}$ (20–50 nm)
Seed Layer 12: $Ru_{50}Al_{50}$ (8–20 nm)
Underlayer 13: $Cr_{50}Ti_{10}$ (6–20 nm)
Lower AFC Film 24' directly on underlayer 13:
  $Co_{(100-x)}Cr_x$ with $11<x<25$, or
  $Co_{(100-y-x)}Pt_yCr_x$, with $0<y<15$ and $11<x<25$, or
  $Co_{(100-y-x-z)}Pt_yCr_xTa_z$ with $0<y<20$, $11<x<22$ and $2<z<6$
Spacer Layer 26: Ru or Cr (0.4–1.0 nm)
Top AFC Film 22: $Co_{(100-y-x-z)}Pt_yCr_xB_z$ with $6<y<25$, $10<x<25$, $6<z<15$.

In the preferred embodiment the ferromagnetic CoCr alloy that serves as the bottom AFC film without the need for a special nucleation layer has a composition with Cr between approximately 11 and 25 atomic percent. The Cr concentration is determined primarily by the thickness and Mrt desired for the bottom AFC film. Since the concentration of Cr determines the $M_s$ of the CoCr alloy, it determines the Mrt of the CoCr film for a given thickness. The desired thickness of the CoCr film is determined by optimum film growth and recording performance. The upper limit is the amount around which the $M_s$ of the CoCr alloy is insufficient for high performance recording.

In addition to this preferred binary alloy of only Co and Cr, the lower ferromagnetic film may also be a ternary or quarternary alloy of CoCr with one or more of platinum (Pt) and tantalum (Ta). The Pt may be a desired additive if more anisotropy is desired in the lower film and the Ta may be a desired additive if more grain isolation is desired. The concentrations of $0<Pt<15$ and $2<Ta<6$ have been determined to be the typical ranges which have successfully achieved these purposes.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording disk comprising:
   a substrate;
   a nonferromagnetic underlayer selected from the group consisting of Cr and alloys of Cr on the substrate;
   a first ferromagnetic film formed directly on and in contact with the underlayer, the first ferromagnetic film being an alloy comprising cobalt (Co) and chromium (Cr), wherein Cr is between approximately 11 and 25 atomic percent in the alloy;
   a nonferromagnetic spacer film on the first ferromagnetic film; and
   a second ferromagnetic film on the spacer film, the second ferromagnetic film being an alloy comprising Co and B, the second ferromagnetic film being exchange coupled antiferromagnetically to the first ferromagnetic film across the spacer film.

2. The disk of claim 1 wherein the first ferromagnetic film has a thickness between approximately 1.5 and 3.5 nm.

3. The disk of claim 1 wherein the underlayer is an alloy of only Cr and titanium (Ti).

4. The disk of claim 1 further comprising a seed layer between the substrate and the underlayer and wherein the underlayer is formed directly on and in contact with the seed layer.

5. The disk of claim 4 wherein the seed layer is an alloy of only ruthenium (Ru) and aluminum (Al).

6. The disk of claim 4 wherein the seed layer is an alloy of only nickel (Ni) and aluminum (Al).

7. The disk of claim 1 wherein the first ferromagnetic film is an alloy of only Co and Cr.

8. The disk of claim 1 wherein the first ferromagnetic film is an alloy further comprising platinum (Pt).

9. The disk of claim 1 wherein the first ferromagnetic film is an alloy further comprising tantalum (Ta).

10. The disk of claim 1 wherein the spacer film consists essentially of ruthenium (Ru).

11. The disk of claim 1 wherein the second ferromagnetic film is an alloy further comprising Cr and Pt.

12. The disk of claim 1 wherein the substrate is glass.

13. The disk of claim 1 further comprising a protective overcoat formed over the second ferromagnetic film.

14. The disk of claim 1 wherein the first ferromagnetic film has a thickness t1 and a magnetization M1, the second ferromagnetic film has a thickness t2 and a magnetization M2, and wherein the magnetic moments per unit area (M1×t1) and (M2×t2) of the first and second ferromagnetic films, respectively, are different from one another.

15. The disk of claim 1 further comprising a second nonferromagnetic spacer film on the second ferromagnetic film and a third ferromagnetic film on the second spacer film, the third ferromagnetic film being exchange coupled antiferromagnetically to the second ferromagnetic film across the second spacer film.

16. A magnetic recording disk comprising:

a glass substrate;

an underlayer selected from the group consisting of Cr, a CrV alloy and a CrTi alloy on the substrate;

a magnetic recording layer on the underlayer and comprising a first ferromagnetic film of an alloy of only Co and Cr, with Cr being between approximately 11 and 25 atomic percent, formed directly on and in contact with the underlayer, a nonferromagnetic spacer film of a material selected from the group consisting of Ru, Cr, rhodium (Rh), iridium (Ir), copper (Cu), and their alloys formed on the first ferromagnetic film, and a second ferromagnetic film of an alloy comprising Co and B on the spacer film, the spacer film having a thickness sufficient to induce the second ferromagnetic film to be exchange coupled antiferromagnetically to the first ferromagnetic film across the spacer film; and a protective overcoat formed on the magnetic recording layer.

17. The disk of claim 16 wherein the first ferromagnetic film has a thickness between approximately 1.5 and 3.5 nm.

18. The disk of claim 16 further comprising a seed layer between the substrate and the underlayer and wherein the underlayer is an alloy of only Cr and titanium (Ti) and is formed directly on and in contact with the seed layer.

19. The disk of claim 17 wherein the seed layer is selected from the group consisting of a RuAl and a NiAl alloy.

20. The disk of claim 16 wherein the spacer film is ruthenium (Ru).

\* \* \* \* \*